Nov. 29, 1949  N. MARCHAND ET AL  2,489,304
DIRECTION FINDER
Filed June 27, 1945
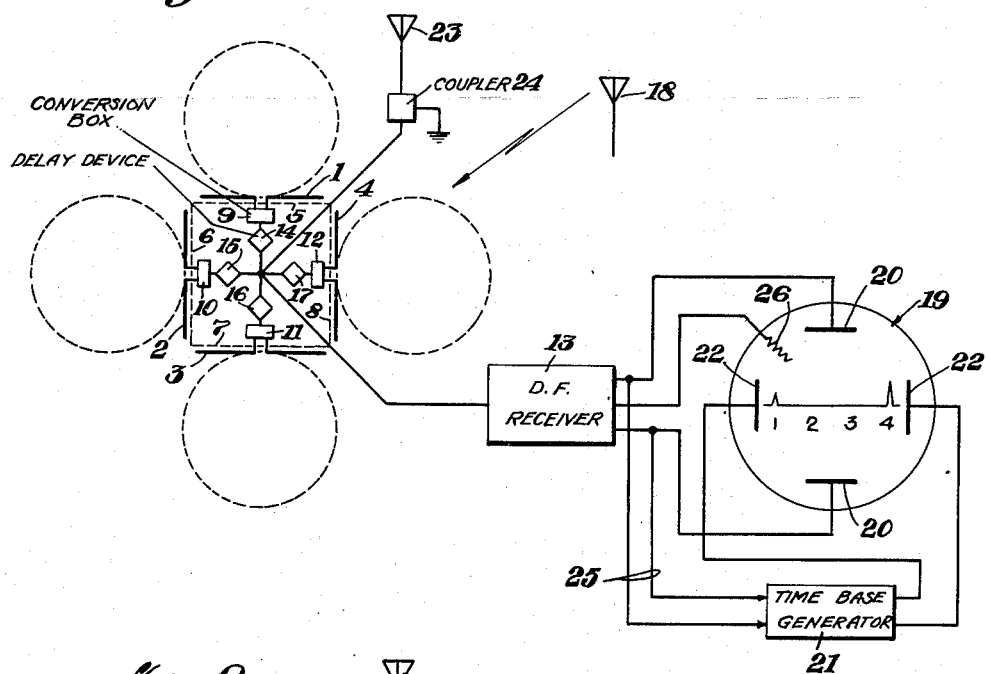
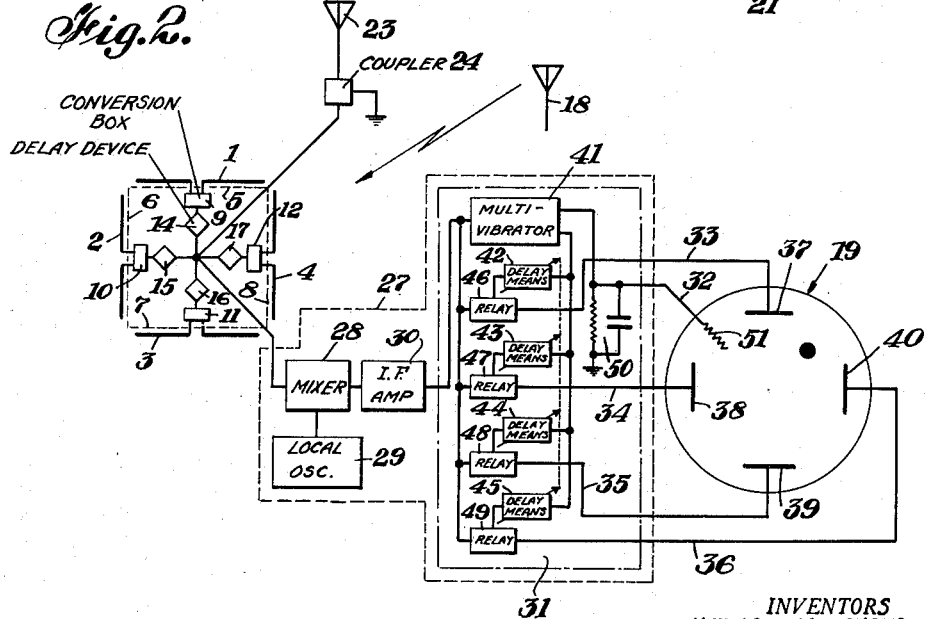
INVENTORS
NATHAN MARCHAND
FRANK O. CHESUS
BY
ATTORNEY Patented Nov. 29, 1949

2,489,304

UNITED STATES PATENT OFFICE 2,489,304

DIRECTION FINDER

Nathan Marchand, New York, and Frank O. Chesus, Jackson Heights, N. Y., assignors to Federal Telephone and Radio Corporation, New York, N. Y., a corporation of Delaware Application June 27, 1945, Serial No. 601,802

10 Claims. (Cl. 343—120)

The present invention relates to direction finders.

Under certain conditions, a direction finder must be capable of obtaining a bearing on a single short burst or pulse of energy from the transmitter. For example, certain radar systems transmit only one pulse on a single frequency. Conventional direction finders which switch directional patterns to obtain a comparison of the energies received according to each pattern are incapable of giving a bearing on a short pulse since only one directional antenna is operative at a given instant and the pulse terminates before the directional patterns are switched, thus preventing comparing the energies received according to said different patterns.

An object of the present invention is the provision of an improved direction finder.

Another object of the present invention is the provision of a direction finder adapted to give a bearing on a single pulse.

In accordance with one aspect of our invention, we accomplish the foregoing by receiving the pulse on two or more directional antennas and delaying the injection of the pulse from each antenna into the receiver a different length of time for each of the different antennas, so that instead of one pulse, the receiver gets a train of pulses which may be then applied to a suitable indicator, such as a cathode ray oscillograph tube having a linear sweep, where the pulses are compared. The first pulse of the train may be used to control the initiation of the sweep.

Other and further objects of the present invention will become apparent and the invention will be best understood from the following description of embodiments thereof, reference being had to the drawings, in which:

Fig. 1 is a block diagram of a direction finder embodying our invention; and

Fig. 2 is a block diagram of a modified form of direction finder embodying our invention.

Referring now to Fig. 1, the antenna system employed utilizes four antenna units 1, 2, 3 and 4, each of which is rendered uni-directional by shield means 5, 6, 7 and 8 respectively so as to provide differently-directed radiation patterns as indicated in dotted lines. It should be understood that while four uni-directional antennas are used, as illustrated, a greater or lesser number may be used as desired. Antenna units 1—4, which are in the form of dipoles, are each coupled separately to conversion or balance boxes 9—12, which convert from a dual transmission line to a single coaxial line. These conversion boxes are in turn coupled to a direction finder receiver 13 by means which introduce different amounts of delay for the energies received by each of said antenna units. Any suitable delay means may be employed, as for example, artificial lines, or the like. The energies from the different antenna units are delayed differently as for example, delay means 14, would delay the energy from antenna unit 1, one microsecond; delay means 15, associated with antenna unit 2, would introduce a delay of three microseconds; delay 16, associated with antenna 3, would introduce a delay of five microseconds; and delay 17, associated with antenna unit 4 has a delay of seven microseconds. Thus theoretically if a single pulse of energy affected all of the antenna units, a train of pulses would be injected into the receiver 13. However, because of the directionality of the system, no more than two antenna units at a time would be affected by a pulse transmitted from a given direction. Thus, for example, energy from a transmitter located at point designated by the numeral 18, would only affect antenna units 1 and 4. Delay means 14—17 are coupled to the D. F. receiver 13.

The output of D. F. receiver 13 is coupled to a suitable indicating device such as for example, a cathode ray oscillograph tube 19, the output of said receiver being connected to the vertically deflecting plates 20 while a time base generator 21 is connected to the horizontally deflecting plates 22 and produces a linear horizontal sweep. The train of pulses then will appear on the screen spread out in various positions corresponding to their time of arrival, with the energy from antenna unit 1 appearing first; that from antenna unit 2, second, etc.

While the first energy to be received at the D. F. receiver from a directional unit may be used to synchronize the operation of the time base generator, it is preferred to utilize energy from a separate omni-directional antenna 23 for this purpose. Antenna 23 is coupled by a suitable coupler 24 to the direction finding receiver without any interposed delay means so that the energy from the omni-directional antenna 23 will arrive ahead of the energy from any of the directional antenna units 1—4. The energy derived from antenna 23 is then applied as indicated by line 25 to the time base generator 21 to initiate the sweep. The succeeding pulses will then be spread out into the positions indicated. The energy from antenna 23 may also be used to light cathode ray tube 19 by controlling the grid 26 of said tube.

Since only the two directive units will receive energy at a time, there will only be two illuminated areas on the screen. The areas which are illuminated will indicate from what quadrant the energy is being received and the relative amplitude of said energy will indicate the direction line in this quadrant. Thus for example, if the screen is illuminated as indicated in Fig. 1, at positions 1 and 4, it will be apparent that energy is being received in some direction common to their directional patterns which is the first quadrant and since the energy from antenna unit 4 is larger, that is, has greater amplitude, it will indicate that the direction line in said quadrant is closer to antenna unit 4 than to antenna unit 1 so that the energy is coming from the direction of point 18 of Fig. 1.

The system illustrated in Fig. 1 requires a certain amount of interpretation before the direction line from which energy is being received can be obtained. In the embodiment of Fig. 2, an instantaneous indication of direction without requiring interpretation is obtained. In Fig. 2, the same antenna system may be employed as in Fig. 1, the output of the antenna system being fed to a direction finding receiver 27 which may have the usual mixer 28 in which energy from the local oscillator 29 is mixed with the radio frequency energy from the antenna system to produce an intermediate frequency which is amplified in an intermediate frequency amplifier 30. The output of the intermediate frequency amplifier 30 is then fed to a channel separator 31 which separates the energy derived from the various antenna units and omni-directional antenna unit 23 according to the time of arrival of said energy in the separator into separate channels 32—35, and the pulse derived from antenna 23 may be used as a marker and the other pulses separated according to their time relationship to said energy derived from antenna 23.

Energy derived from antenna 23 may be applied to channel 32 to control the conduction of the cathode ray tube 19 and energy from antenna units 1—4 may be separated along channels 33—36 to deflection plates 37—40 respectively, the position of the deflecting plates corresponding to the position of the antenna units by whose energy the charges on these plates are controlled. In the absence of incoming energy the spot or beam of the cathode ray tube would be directed toward the center of the screen. If energy is being received from point 18, deflecting plates 37 and 40 will receive energy from antenna units 1 and 4 respectively. The spot will thus be deflected as indicated and will thereby produce an indication of the direction from which energy is being received on the antenna system.

The channel separator 31 may be any one of a number of different arrangements and may consist, for example, of a multivibrator 41 whose operation is initiated by the first energy arriving to produce a square wave or rectangular pulse which is applied in series with delay means 42—45 respectively of progressively increasing delay value to close normally open electronic relays 46—49 in channels 33—36 consecutively so that as successive pulses arrive, channels 33—36 become conductive consecutively, thus separating the pulses according to their time of arrival. The square wave pulse produced by the multivibrator 41 may also be applied through a suitable RC arrangement 50 to control the grid 51 of the cathode ray oscillograph tube and render the tube conductive throughout one entire cycle during which one train of successive energies arrive. The multivibrator 41 is of the type which when once triggered will go through a complete cycle of operation without being materially affected by any energy externally applied thereto until the cycle has been completed. Other forms of channel separators such as types including resonant circuits tuned to different repetition frequency rates may be employed. In the type of channel separator here described, the electronic relays 46—49 may be used as detectors to change the intermediate frequency energy into direct current. However, if a form of channel separator is employed which does not detect the intermediate frequency energy, separate detectors may be inserted in each channel following the channel separator.

If the transmitted energy is in the form of pulses which are repeated at a given repetition rate, the total or greatest delay time in the D. F. receiver should be substantially less than said repetition rate so that all the various delayed energies in the receiver derived from a single transmitted pulse will have appeared on the screen of the cathode ray tube before the next transmitted pulse reaches the D. F. receiver antenna system. To allow for differences in the repetition rate of the transmitted energy, the delay means 42—45, the multivibrator 41 and the rate of sweep of the cathode ray oscillograph tube in the first embodiment should be made adjustable.

While we have described above the principles of our invention in connection with specific apparatus, and particular modifications thereof, it is to be clearly understood that this description is made only by way of example and not as a limitation on the scope of our invention as defined in the accompanying claims.

We claim:

1. A direction finder comprising a plurality of differently directed antenna units, a direction finding receiver, means coupling said units to said receiver including delay means for delaying the energies received by each of said units a different amount so that said energies are delivered successively to said receiver, and means for indicating the comparative value of each of the successive energies.

2. A direction finder comprising a plurality of differently directed antenna units, a direction finding receiver, means coupling said units to said receiver including delay means interposed between each of said units in said receiver, said delay means having a different value for each unit for delaying the energies received by each of said units a different amount whereby said energies are delivered successively to said receiver, and means for indicating the comparative value of each of the successive energies.

3. A direction finder comprising a plurality of differently directed antenna units, a direction finding receiver, means coupling said units to said receiver including delay means for delaying the energies received by each of said units a different amount whereby said energies are delivered successively to said receiver, means for separating the successive energies, and means for indicating the comparative value of the successive energies.

4. A direction finder according to claim 1, wherein said means for indicating the comparative values of the successive energies includes a cathode ray oscillograph tube having deflecting plates to which said energies are applied, and further including an omni-directional antenna, energy from which controls the lighting of said tube.

5. A direction finder according to claim 1, wherein said means for indicating the comparative values of each of the successive energies includes a cathode ray oscillograph tube, having two pairs of deflecting plates at right angles to each other, said energies being applied to one set of said plates, and means for producing a linear sweep coupled to the other pair of said plates, and further including an omni-directional antenna, energy from which controls the initiation of said linear sweep.

6. A direction finder according to claim 3, wherein said means for indicating the comparative values of said energies comprises a cathode ray oscillograph tube having a plurality of deflection plates to separate ones of which the separated energies are applied, and further including an omni-directional antenna controlling the lighting of said cathode ray oscillograph tube.

7. A direction finder comprising a receiver, a normally inoperative indicator, a plurality of different directed antenna units, an omnidirectional antenna unit, means for separately and successively applying pulse energy received by each of said units to said receiver, means for applying the pulse energy, received by said omni-directional antenna unit, from the output of said receiver to said indicator for causing operation thereof, means for sequentially indicating the pulse energies received by each of said directed units comprising means for applying said last named energies from the output of said receiver to said indicator.

8. A direction finder according to claim 7, said indicator comprises a cathode ray oscillograph, said oscillograph comprising a time base generating circuit controlled by the omnidirectional antenna unit pulse energies from the output of said receiver.

9. A direction finder comprising a plurality of differently directed antenna units, an omnidirectional antenna unit, a receiver, means for separately and successively applying pulse energy received by each of said units to said receiver, means for indicating the direction of propagation of said received energy pulses comprising a normally inoperative indicator and a channel separator, said channel separator comprising means for separating the output of said receiver in accordance with the sequence of said successively applied energy, means for applying the pulse energy, received by said omni-directional antenna unit, from said separated output to said indicator for causing operation thereof, and means for applying the pulse energy received by said directed antenna units, from said separated output to said indicator for indication thereby.

10. A direction finder comprising a plurality of differently directed antenna units, an omnidirectional antenna unit, a direction finding receiver, means coupling said units to said receiver including delay means for delaying the energy received by each of said directed units for different amounts whereby said last named energies are delivered successively to said receiver, a channel separator device, a cathode ray oscillograph, said device comprising separate controlled relay means for applying each of said differently delayed signals after passage through said receiver to give deflection elements of said cathode ray oscillograph, a pulse generator circuit triggered by the energy received by said omnidirectional antenna after passage through said receiver for producing a gating pulse means for delaying said gating pulse for predetermined time intervals before application to control said relay means.

NATHAN MARCHAND.
FRANK O. CHESUS.

REFERENCES CITED

The following references are of record in the file of this patent:

UNITED STATES PATENTS

| Number | Name | Date |
| --- | --- | --- |
| 2,271,550 | Hermanspann et al. | Feb. 3, 1942 |
| 2,275,296 | Hagen | Mar. 3, 1942 |
| 2,418,308 | Luck | Apr. 1, 1947 |

FOREIGN PATENTS

| Number | Country | Date |
| --- | --- | --- |
| 495,515 | Great Britain | Nov. 15, 1938 |
| 479,689 | Great Britain | Feb. 8, 1938 |